United States Patent
Linde et al.

(10) Patent No.: US 8,739,863 B2
(45) Date of Patent: Jun. 3, 2014

(54) REMOTE OPERATION OF A ROTATING CONTROL DEVICE BEARING CLAMP

(75) Inventors: Leonard Charles Linde, Casper, WY (US); Fredrick D. Curtis, Houston, TX (US); Derrick W. Lewis, Conroe, TX (US); Joseph Michael Karigan, Carrollton, TX (US); Mike Harvey, Granite Shoals, TX (US); Neal G. Skinner, Lewisville, TX (US); Matthew H. Wiggins, Odessa, TX (US); Patrick Looper, Odessa, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 44 days.

(21) Appl. No.: 13/300,320

(22) Filed: Nov. 18, 2011

(65) Prior Publication Data
US 2012/0125636 A1    May 24, 2012

(30) Foreign Application Priority Data

Nov. 20, 2010    (WO) ................ PCT/US2010/057539

(51) Int. Cl.
*E21B 19/00*    (2006.01)
(52) U.S. Cl.
USPC .......... 166/84.1; 166/84.3; 403/338; 285/411
(58) Field of Classification Search
USPC ........ 166/84.3, 84.1, 85.4, 96.1; 403/33, 338, 403/335; 285/367, 411, 419, 920
See application file for complete search history.

(56) References Cited

U.S. PATENT DOCUMENTS

| | | | |
|---|---|---|---|
| 5,651 A * | 6/1848 | West et al. | 285/411 |
| 2,326,941 A * | 8/1943 | Heitner | 403/286 |
| 2,684,166 A | 7/1954 | Jarnett | |
| 2,897,895 A | 8/1959 | Ortloff | |

(Continued)

FOREIGN PATENT DOCUMENTS

| EP | 1432887 B1 | 3/2006 |
|---|---|---|
| EP | 1595057 B1 | 7/2006 |

(Continued)

OTHER PUBLICATIONS

International Search Report with Written Opinion issued Aug. 19, 2011 for International Patent Application No. PCT/US/10/057540, 11 pages.

(Continued)

*Primary Examiner* — Kenneth L Thompson
*Assistant Examiner* — Taras P Bemko
(74) *Attorney, Agent, or Firm* — Smith IP Services, P.C.

(57) ABSTRACT

An RCD can include a housing assembly containing a bearing assembly and a rotating seal which seals an annulus between a tubular string and a body of the RCD, and a remotely operable clamp device which selectively permits and prevents displacement of the housing assembly relative to the body. A method of remotely operating a clamp device can include rotating a threaded member which is secured relative to an RCD body, and displacing a clamp section in response to the threaded member rotation, thereby selectively securing and releasing a bearing assembly and an annular seal relative to the body. Another RCD can include a rotating seal which seals an annulus between a tubular string and a body of the RCD, and a remotely operable clamp device which selectively permits and prevents access to an interior of the body, the clamp device including a motor which rotates a threaded member.

22 Claims, 11 Drawing Sheets

(56) References Cited

U.S. PATENT DOCUMENTS

| | | |
|---|---|---|
| 3,071,188 A | 1/1963 | Raulins |
| 3,142,337 A | 7/1964 | Poorman, Jr. et al. |
| 3,163,223 A | 12/1964 | Bauer et al. |
| 3,251,611 A | 5/1966 | Haeber et al. |
| 3,387,851 A | 6/1968 | Cugini |
| 3,472,518 A | 10/1969 | Harlan |
| 3,561,723 A | 2/1971 | Cugini |
| 3,614,111 A | 10/1971 | Regan |
| 3,621,912 A | 11/1971 | Woody, Jr. et al. |
| 3,695,633 A | 10/1972 | Hanes |
| 3,868,832 A | 3/1975 | Biffle |
| 3,967,678 A | 7/1976 | Blackwell |
| 4,033,701 A * | 7/1977 | Labyer et al. ............... 403/13 |
| 4,098,341 A | 7/1978 | Lewis |
| 4,185,856 A | 1/1980 | McCaskill |
| 4,258,792 A | 3/1981 | Restarick |
| 4,285,406 A | 8/1981 | Garrett et al. |
| 4,293,047 A | 10/1981 | Young |
| 4,304,310 A | 12/1981 | Garrett |
| 4,312,404 A | 1/1982 | Morrow |
| 4,416,340 A | 11/1983 | Bailey |
| 4,448,255 A | 5/1984 | Shaffer et al. |
| 4,494,609 A | 1/1985 | Schwendemann |
| 4,526,406 A | 7/1985 | Nelson |
| 4,531,580 A | 7/1985 | Jones |
| 4,546,828 A | 10/1985 | Roche |
| 4,601,608 A | 7/1986 | Ahlstone |
| 4,626,135 A | 12/1986 | Roche |
| 4,673,041 A | 6/1987 | Turner et al. |
| 4,693,497 A | 9/1987 | Pettus et al. |
| 4,754,820 A | 7/1988 | Watts et al. |
| 4,813,495 A | 3/1989 | Leach |
| 4,828,024 A | 5/1989 | Roche |
| 5,022,472 A | 6/1991 | Bailey et al. |
| 5,085,129 A * | 2/1992 | Dugan .......................... 92/84 |
| 5,137,084 A | 8/1992 | Gonzales et al. |
| 5,166,650 A * | 11/1992 | Simmons et al. ............. 333/254 |
| 5,178,215 A | 1/1993 | Yenulis et al. |
| 5,213,158 A | 5/1993 | Bailey et al. |
| 5,224,557 A | 7/1993 | Yenulis et al. |
| 5,277,249 A | 1/1994 | Yenulis et al. |
| 5,279,365 A | 1/1994 | Yenulis et al. |
| 5,322,137 A | 6/1994 | Gonzales |
| 5,409,073 A | 4/1995 | Gonzales |
| 5,588,491 A | 12/1996 | Brugman et al. |
| 5,647,444 A | 7/1997 | Williams |
| 5,662,181 A | 9/1997 | Williams et al. |
| 5,720,356 A | 2/1998 | Gardes |
| 6,016,880 A | 1/2000 | Hall et al. |
| 6,024,172 A | 2/2000 | Lee |
| 6,065,550 A | 5/2000 | Gardes |
| 6,109,348 A | 8/2000 | Caraway |
| 6,129,152 A | 10/2000 | Hosie et al. |
| 6,138,774 A | 10/2000 | Bourgoyne, Jr. et al. |
| 6,230,824 B1 | 5/2001 | Peterman et al. |
| 6,263,982 B1 | 7/2001 | Hannegan et al. |
| 6,276,450 B1 | 8/2001 | Senevirante |
| 6,325,159 B1 | 12/2001 | Peterman et al. |
| 6,457,540 B2 | 10/2002 | Gardes |
| 6,470,975 B1 | 10/2002 | Bourgoyne et al. |
| 6,547,002 B1 | 4/2003 | Bailey et al. |
| 6,554,016 B2 | 4/2003 | Kinder |
| 6,588,502 B2 | 7/2003 | Nice |
| 6,702,012 B2 | 3/2004 | Bailey et al. |
| 6,732,804 B2 | 5/2004 | Hosie et al. |
| 6,749,172 B2 | 6/2004 | Kinder |
| 6,896,076 B2 | 5/2005 | Nelson et al. |
| 6,904,981 B2 | 6/2005 | van Riet |
| 6,913,092 B2 | 7/2005 | Bourgoyne et al. |
| 6,953,085 B2 | 10/2005 | Nice |
| 6,981,561 B2 | 1/2006 | Krueger et al. |
| 7,004,444 B2 | 2/2006 | Kinder |
| 7,007,913 B2 | 3/2006 | Kinder |
| 7,040,394 B2 | 5/2006 | Bailey et al. |
| 7,044,237 B2 | 5/2006 | Leuchtenberg |
| 7,055,627 B2 | 6/2006 | Fontana et al. |
| 7,080,685 B2 | 7/2006 | Bailey et al. |
| 7,096,975 B2 | 8/2006 | Aronstam et al. |
| 7,134,489 B2 | 11/2006 | Van Riet |
| 7,159,669 B2 | 1/2007 | Bourgoyne et al. |
| 7,165,610 B2 | 1/2007 | Hopper |
| 7,174,975 B2 | 2/2007 | Krueger et al. |
| 7,185,718 B2 | 3/2007 | Gardes |
| 7,185,719 B2 | 3/2007 | van Riet |
| 7,237,623 B2 | 7/2007 | Hannegan |
| 7,258,171 B2 | 8/2007 | Bourgoyne et al. |
| 7,264,058 B2 | 9/2007 | Fossli |
| 7,270,185 B2 | 9/2007 | Fontana et al. |
| 7,273,102 B2 | 9/2007 | Sheffield |
| 7,278,496 B2 | 10/2007 | Leuchtenberg |
| 7,350,597 B2 | 4/2008 | Reitsma et al. |
| 7,353,887 B2 | 4/2008 | Krueger et al. |
| 7,367,410 B2 | 5/2008 | Sangesland |
| 7,367,411 B2 | 5/2008 | Leuchtenberg |
| 7,395,878 B2 | 7/2008 | Reitsma et al. |
| 7,472,870 B2 * | 1/2009 | Zagorski et al. ............... 248/65 |
| 7,487,837 B2 | 2/2009 | Bailey et al. |
| 7,497,266 B2 | 3/2009 | Fossli |
| 7,513,310 B2 | 4/2009 | Fossli |
| 7,562,723 B2 | 7/2009 | Reitsma |
| 7,650,950 B2 | 1/2010 | Luechtenberg |
| 7,658,228 B2 | 2/2010 | Moksvold |
| 7,665,773 B2 * | 2/2010 | Jones et al. ................... 285/421 |
| 7,677,329 B2 | 3/2010 | Stave |
| 7,699,109 B2 | 4/2010 | May et al. |
| 7,708,064 B2 | 5/2010 | Sehsah |
| 7,721,822 B2 | 5/2010 | Krueger et al. |
| 7,779,903 B2 | 8/2010 | Bailey et al. |
| 7,806,203 B2 | 10/2010 | Krueger et al. |
| 7,836,946 B2 | 11/2010 | Bailey et al. |
| 7,926,560 B2 | 4/2011 | Bailey et al. |
| 7,926,593 B2 | 4/2011 | Bailey et al. |
| 8,033,335 B2 | 10/2011 | Orbell et al. |
| 2002/0112888 A1 | 8/2002 | Leuchtenberg |
| 2003/0066650 A1 | 4/2003 | Fontana et al. |
| 2003/0098181 A1 | 5/2003 | Aronstam et al. |
| 2004/0009033 A1* | 1/2004 | Rieber et al. ................... 403/338 |
| 2004/0206548 A1 | 10/2004 | Aronstam et al. |
| 2006/0065402 A9 | 3/2006 | Fontana et al. |
| 2006/0086538 A1 | 4/2006 | Van Riet |
| 2006/0124318 A1 | 6/2006 | Sheffield |
| 2006/0144622 A1 | 7/2006 | Bailey et al. |
| 2006/0169491 A1 | 8/2006 | Fossli |
| 2007/0012457 A1 | 1/2007 | Curtis et al. |
| 2007/0068704 A1 | 3/2007 | Krueger et al. |
| 2007/0240875 A1 | 10/2007 | Van Riet |
| 2007/0278007 A1 | 12/2007 | Krueger et al. |
| 2008/0017388 A1* | 1/2008 | Kulhanek et al. ............. 166/381 |
| 2008/0105434 A1 | 5/2008 | Orbell et al. |
| 2008/0251257 A1 | 10/2008 | Luechtenberg |
| 2009/0057021 A1 | 3/2009 | Williams |
| 2009/0101351 A1 | 4/2009 | Hannegan |
| 2009/0211239 A1 | 8/2009 | Askeland |
| 2010/0006297 A1 | 1/2010 | Stave |
| 2010/0018715 A1 | 1/2010 | Orbell et al. |
| 2010/0175882 A1 | 7/2010 | Bailey et al. |
| 2011/0024195 A1 | 2/2011 | Hoyer et al. |
| 2011/0108282 A1 | 5/2011 | Kozicz et al. |
| 2011/0127040 A1 | 6/2011 | Humphreys |
| 2011/0168392 A1 | 7/2011 | Bailey et al. |

FOREIGN PATENT DOCUMENTS

| | | |
|---|---|---|
| EP | 1488073 B1 | 8/2006 |
| EP | 1664478 B1 | 12/2006 |
| EP | 2150681 A1 | 10/2007 |
| EP | 2050924 A2 | 4/2009 |
| EP | 1356186 B1 | 6/2009 |
| EP | 2208855 A2 | 1/2010 |
| EP | 2216498 A2 | 8/2010 |
| EP | 2378056 A2 | 10/2011 |
| GB | 2478119 A | 8/2011 |
| WO | 9942696 A1 | 8/1999 |
| WO | 0183941 A1 | 11/2001 |

(56) References Cited

FOREIGN PATENT DOCUMENTS

| | | | |
|---|---|---|---|
| WO | 0190528 | A1 | 11/2001 |
| WO | 0244518 | A1 | 6/2002 |
| WO | 03015336 | A1 | 2/2003 |
| WO | 03025334 | A8 | 3/2003 |
| WO | 2004005667 | A1 | 1/2004 |
| WO | 03071091 | A9 | 8/2004 |
| WO | 2004074627 | A1 | 9/2004 |
| WO | 2004085788 | A3 | 11/2004 |
| WO | 2005001237 | A1 | 1/2005 |
| WO | 2005017308 | A1 | 2/2005 |
| WO | 2006029379 | A1 | 3/2006 |
| WO | 2006031119 | A1 | 3/2006 |
| WO | 2006099362 | A1 | 9/2006 |
| WO | 2006118920 | A3 | 11/2006 |
| WO | 2006138565 | A1 | 12/2006 |
| WO | 2007008085 | A1 | 1/2007 |
| WO | 2007016000 | A1 | 2/2007 |
| WO | 2007030017 | A1 | 3/2007 |
| WO | 2007081711 | A3 | 7/2007 |
| WO | 2007112292 | A3 | 10/2007 |
| WO | 2007124330 | A3 | 11/2007 |
| WO | 2007126833 | A1 | 11/2007 |
| WO | 2008120025 | A2 | 10/2008 |
| WO | 2008133523 | A1 | 11/2008 |
| WO | 2008134266 | A1 | 11/2008 |
| WO | 2008156376 | A1 | 12/2008 |
| WO | 2009017418 | A1 | 2/2009 |
| WO | 2009018448 | A1 | 2/2009 |
| WO | 2009058706 | A2 | 5/2009 |
| WO | 2009086442 | A1 | 7/2009 |
| WO | 2008151128 | A9 | 2/2010 |

OTHER PUBLICATIONS

International Search Report with Written Opinion issued Aug. 19, 2011 for International Patent Application No. PCT/US/10/057539, 12 pages.

International Search Report with Written Opinion issued Sep. 28, 2011 for International Patent Application No. PCT/US11/029116, 9 pages.

International Search Report with Written Opinion issued Sep. 29, 2011 for International Patent Application No. PCT/US11/028384, 11 pages.

International Preliminary Report on Patentability issued Oct. 4, 2012 for US PCT Patent Application No. PCT/US2011/029116, 6 pages.

Diamond Rotating Heads, Inc.; Diamond Model 8000/9000, Technical data sheet, received Dec. 3, 2010, 2 pages.

Diamond Rotating Heads, Inc.; Product information, company brochure, received Dec. 3, 2010, 4 pages.

Halliburton Energy Services, Inc.; "RCD 5000 Rotating Control Device", H05284, dated Feb. 2010, 8 pages.

Halliburton Energy Services, Inc.; "RCD 1000 Rotating Control Device", H07903, dated Aug. 2010, 2 pages.

Vector Group; "Optima Subsea Connector", company web page, dated 2010, 2 pages.

Weatherford; "Williams Model IP 1000", brochure # 325.02, dated 2002, 2 pages.

Weatherford; "Model 7000", Technical data sheet, dated Nov. 2006, 2 pages.

Weatherford; "Model 7100" Technical data sheet, dated Nov. 2006, 2 pages.

Weatherford; "Model 7800 Rotating Control Device" Technical data sheet, dated Nov. 2006, 2 pages.

Weatherford; "Model 8000" Technical data sheet, dated Nov. 2006, 2 pages.

Weatherford; "Model 9000" Technical data sheet, dated Nov. 2006, 2 pages.

Weatherford; "Model IP 1000" Technical data sheet, dated Nov. 2006, 2 pages.

Weatherford; "Weatherford Model 7800 Rotating Control Device", 4593.00, dated 2007, 5 pages.

Weatherford; "Model 7875 Rotating Control Device", 4594.01, dated 2010, 4 pages.

Cameron; "Deepwater Collet Connector", web page, dated 2006, 1 page.

Don Hannegan; "Offshore drilling hazard mitigation: Controlled pressure drilling redefines what is drillable", Drilling Contractor magazine, dated Jan./Feb. 2009, 4 pages.

Vetcogray; "H-4 Subsea Connectors", GE Oil & Gas article, dated Jan. 9, 2008, 7 pages.

Smith Services; "Hold 2500 Rotating Control Device", brochure SS-04-0055.10M, dated 2004, 4 pages.

Smith Services; "Marine Riser RCD", company presentation, dated Jul. 2009, 18 pages.

Oceaneering; "Remotely Operated Connectors", Grayloc Products webpage, received Feb. 18, 2010, 2 pages.

* cited by examiner

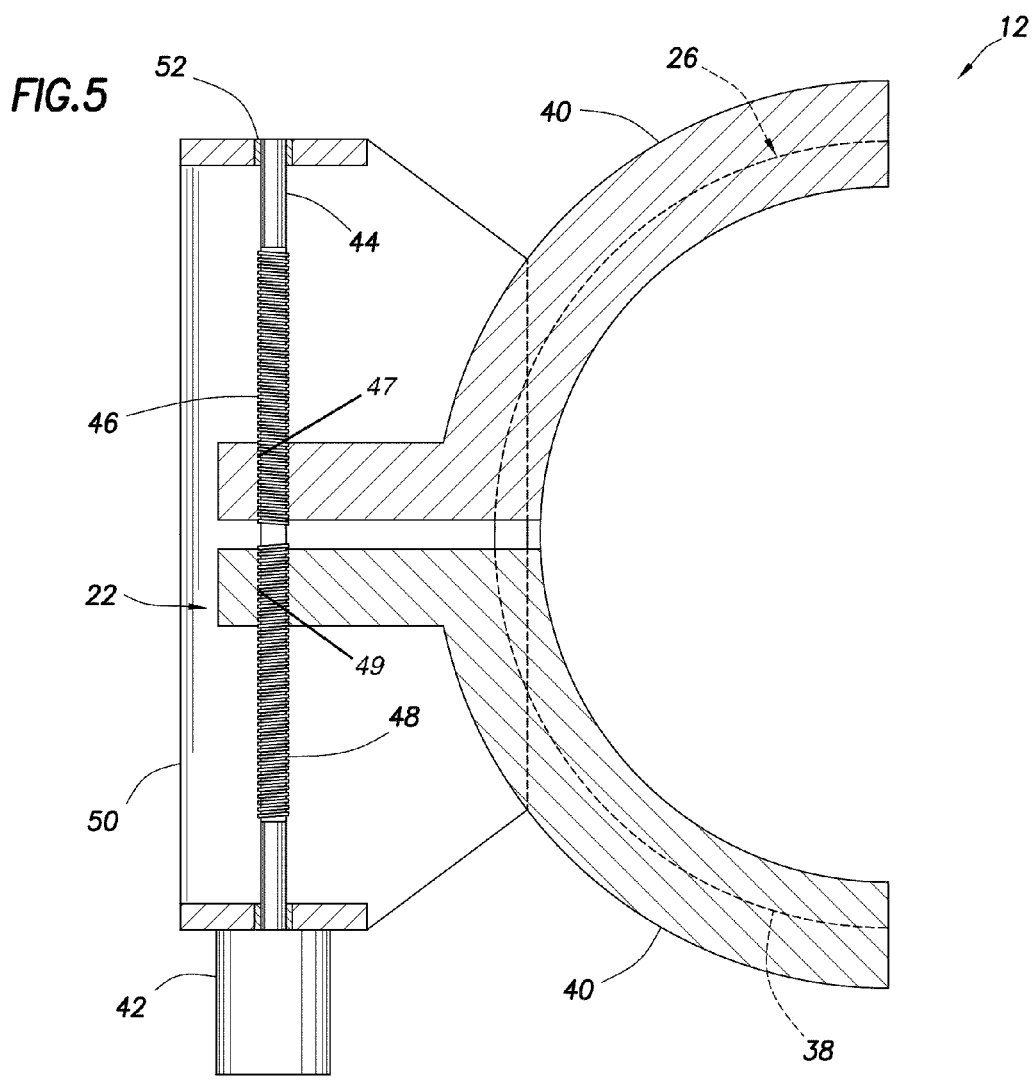
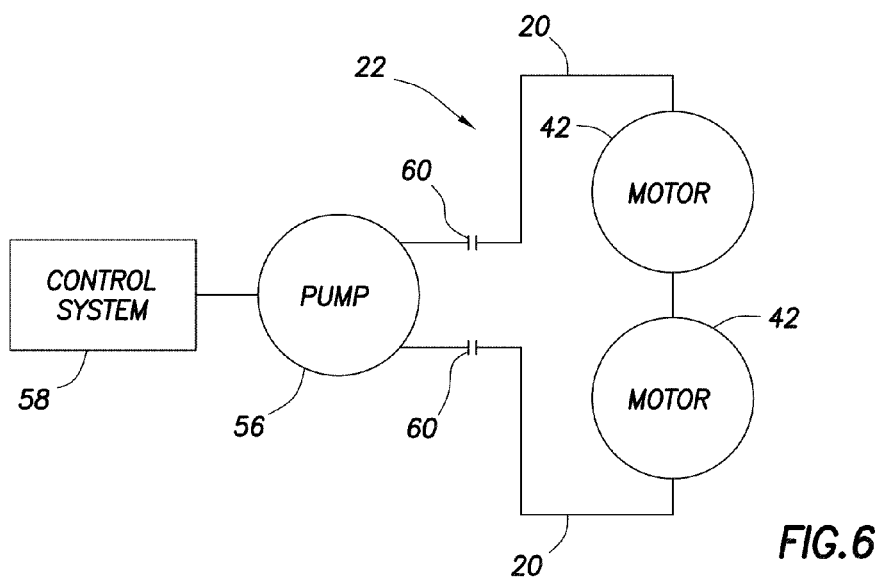

REMOTE OPERATION OF A ROTATING CONTROL DEVICE BEARING CLAMP

CROSS-REFERENCE TO RELATED APPLICATION

This application claims the benefit under 35 USC §119 of the filing date of International Application Serial No. PCT/US10/57539, filed 20 Nov. 2010. The entire disclosure of this prior application is incorporated herein by this reference.

BACKGROUND

The present disclosure relates generally to equipment utilized and operations performed in conjunction with a subterranean well and, in an embodiment described herein, more particularly provides for remote operation of a rotating control device bearing clamp.

A conventional rotating control device may require human activity in close proximity thereto, in order to maintain or replace bearings, seals, etc. of the rotating control device. It can be hazardous for a human to be in close proximity to a rotating control device, for example, if the rotating control device is used with a floating rig.

Therefore, it will be appreciated that improvements are needed in the art of constructing rotating control devices. These improvements would be useful whether the rotating control devices are used with offshore or land-based rigs.

BRIEF DESCRIPTION OF THE DRAWINGS

FIG. 5 is a schematic partially cross-sectional top view of the clamp device in the clamped arrangement.

FIG. 6 is a schematic fluid circuit diagram for operation of the clamp device.

DETAILED DESCRIPTION

Figure 1:
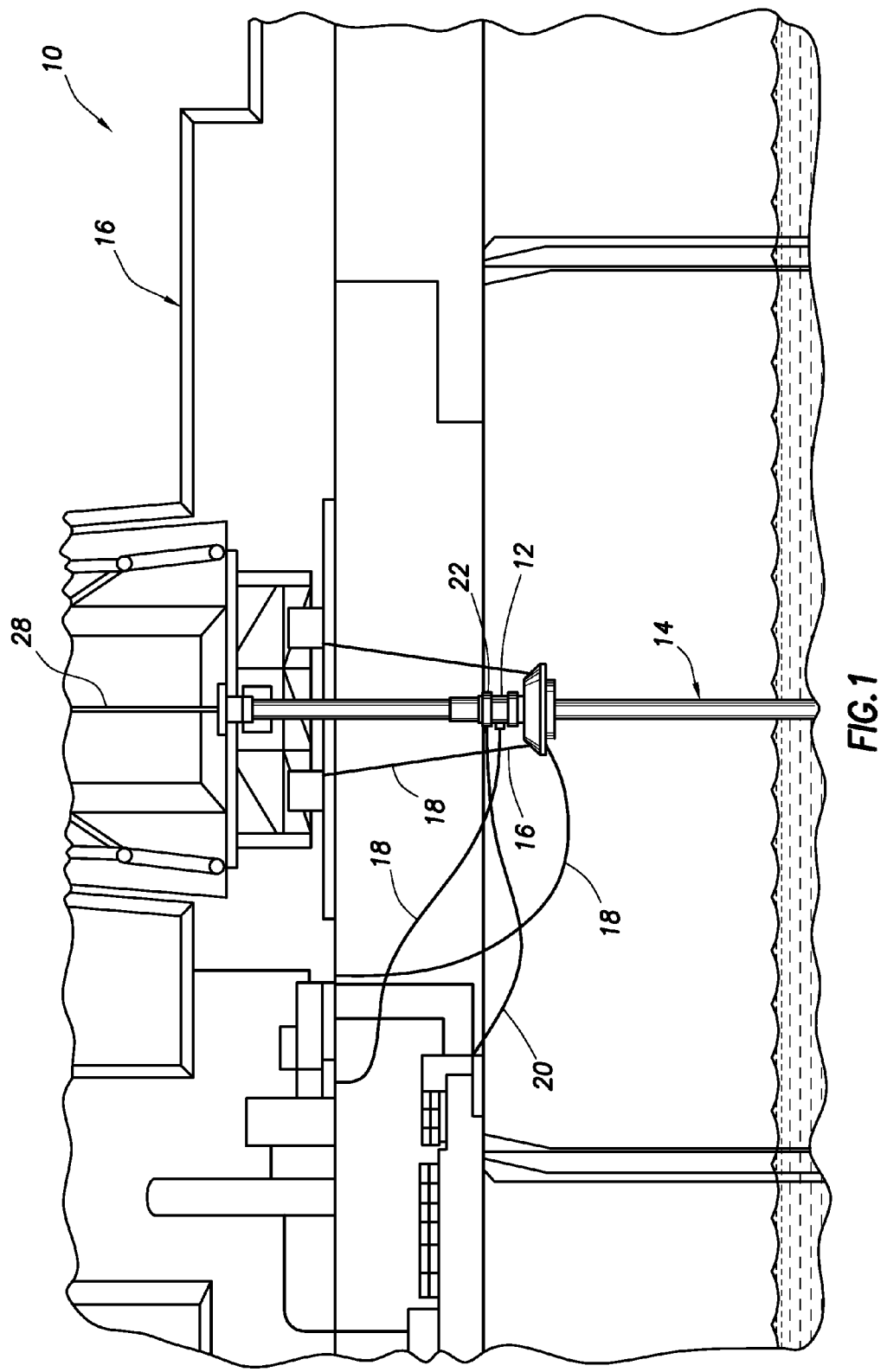
FIG. 1 is a schematic view of a well system and associated method which embody principles of the present disclosure.

Representatively illustrated in FIG. 1 is a well system 10 and associated method which can embody principles of the present disclosure. In the system 10, a rotating control device (RCD) 12 is connected at an upper end of a riser assembly 14. The riser assembly 14 is suspended from a floating rig 16.

It will be readily appreciated by those skilled in the art that the area (known as the "moon pool") surrounding the top of the riser assembly 14 is a relatively hazardous area. For example, the rig 16 may heave due to wave action, multiple lines and cables 18 may be swinging about, etc. Therefore, it is desirable to reduce or eliminate any human activity in this area.

Seals and bearings in a rotating control device (such as the RCD 12) may need to be maintained or replaced, and so one important feature of the RCD depicted in FIG. 1 is that its clamp device 22 can be unclamped and clamped without requiring human activity in the moon pool area of the rig 16. Instead, fluid pressure lines 20 are used to apply pressure to the clamp device 22, in order to clamp and unclamp the device (as described more fully below).

Figure 2:
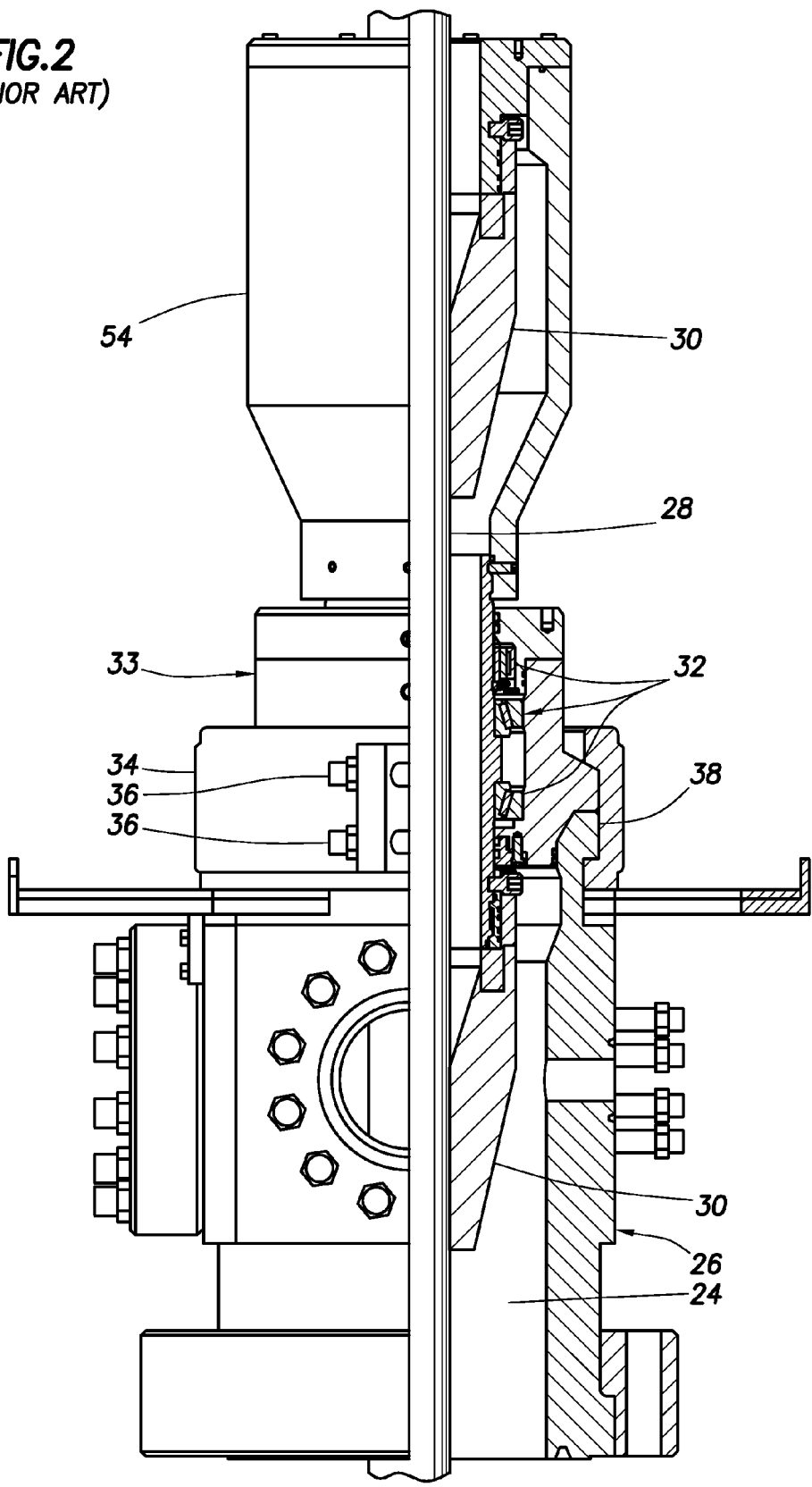
FIG. 2 is a partially cross-sectional view of a prior art rotating control device.

Referring additionally now to FIG. 2, a prior art rotating control device is representatively illustrated. The rotating control device depicted in FIG. 2 is used as an example of a type of rotating control device which can be improved using the principles of this disclosure. However, it should be clearly understood that various other types of rotating control devices can incorporate the principles of this disclosure, as well.

Rotating control devices are also known by the terms "rotating control head," "rotating blowout preventer," "rotating diverter" and "RCD." A rotating control device is used to seal off an annulus 24 formed radially between a body 26 of the rotating control device and a tubular string 28 (such as a drill string) positioned within the body. The annulus 24 is sealed off by the rotating control device, even while the tubular string 28 rotates therein.

For this purpose, the rotating control device includes one or more annular seals 30. If multiple seals 30 are used, the rotating control device may include an upper seal housing 54. To permit the seals 30 to rotate as the tubular string 28 rotates, a bearing assembly 32 is provided in a bearing housing assembly 33.

A clamp 34 releasably secures the housing assembly 33 (with the bearing assembly 32 and seals 30 therein) to the body 26, so that the bearing assembly and seals can be removed from the body for maintenance or replacement. However, in the prior art configuration of FIG. 2, threaded bolts 36 are used to secure ends of the clamp 34, and so human activity in the area adjacent the rotating control device (e.g., in the moon pool) is needed to unbolt the ends of the clamp whenever the bearing assembly 32 and seals 30 are to be removed from the body 26. This limits the acceptability of the FIG. 2 rotating control device for use with land rigs, floating rigs, other types of offshore rigs, etc.

Figure 3:
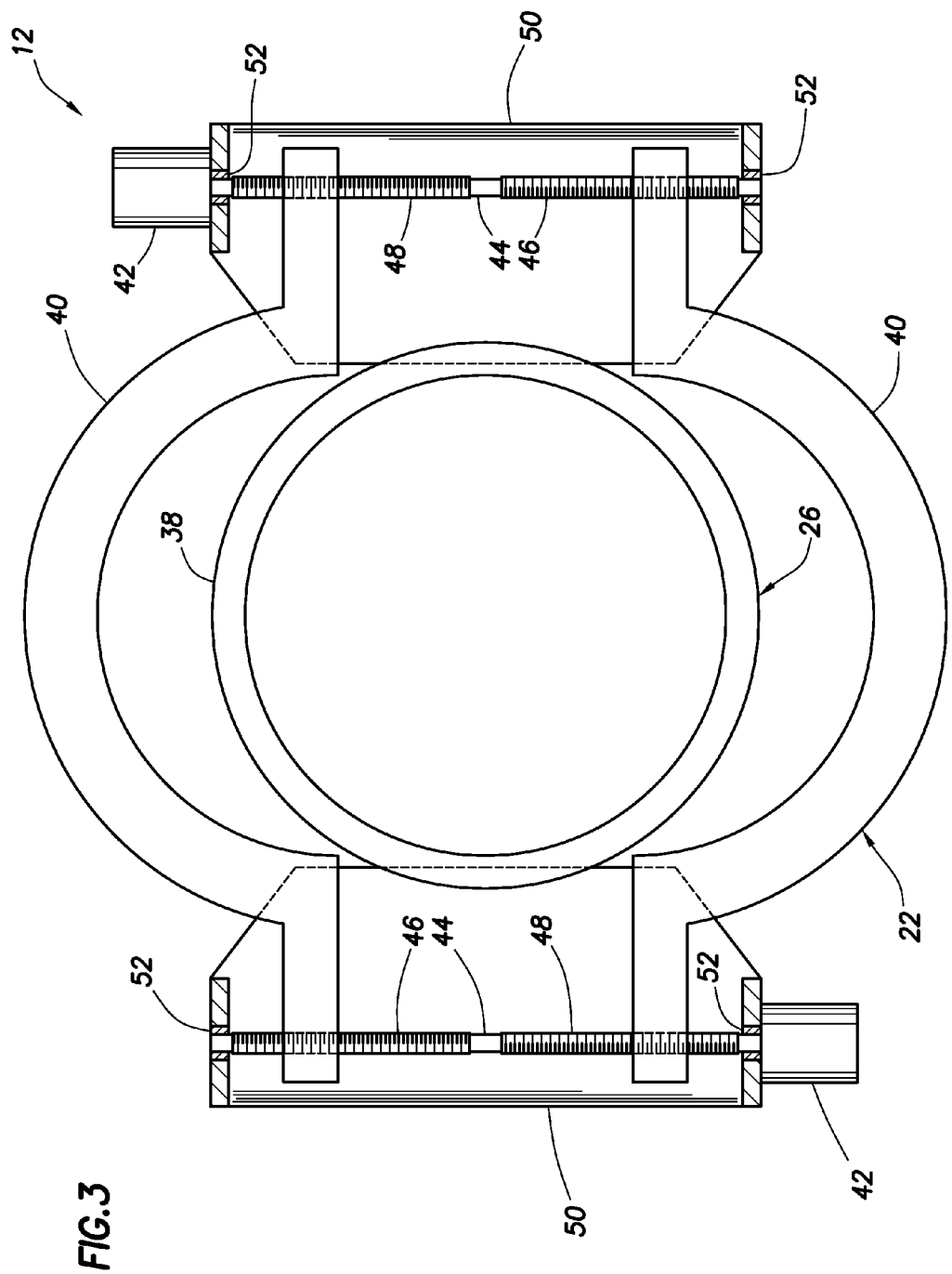
FIG. 3 is a schematic partially cross-sectional top view of an improvement to the rotating control device, the improvement comprising a clamp device and embodying principles of this disclosure, and the clamp device being shown in an unclamped arrangement.

Referring additionally now to FIG. 3, the improved RCD 12 having the remotely operable clamp device 22 is representatively illustrated. For illustrative clarity, only an upper, outwardly projecting lip 38 of the body 26 is shown, since the lip is the portion of the body which is engaged by the clamp device 22 in this example.

An unclamped configuration of the clamp device 22 is depicted in FIG. 3. In this configuration, two clamp sections 40 have been displaced outward, thereby permitting removal of the housing assembly 33, bearing assembly 32 and seals 30 from the body 26.

The clamp sections 40 are displaced outward (in opposite directions, away from each other) by two fluid motors 42. The motors 42 rotate respective threaded members 44, which are threaded into each of the clamp sections 40.

Note that each threaded member 44 has two oppositely threaded portions 46, 48 (e.g., with one portion being right-hand threaded, and the other portion being left-hand threaded). Thus, as a threaded member 44 rotates, it will cause the clamp sections 40 to displace in opposite directions (toward or away from each other, depending on the direction of rotation of the threaded member).

The motors 42, ends of the clamp sections 40 and ends of the threaded members 44 are supported by bracket-type supports 50. The ends of the threaded members 44 preferably are rotationally mounted to the supports 50 using, for example, bushings 52. The motors 42 are preferably rigidly mounted to the supports 50, for example, using fasteners (not shown).

Although two each of the clamp sections 40, motors 42 and threaded members 44 are depicted in FIGS. 2 & 3, it should be clearly understood that any number (including one) of these components may be used in keeping with the principles of this disclosure.

Figure 4:
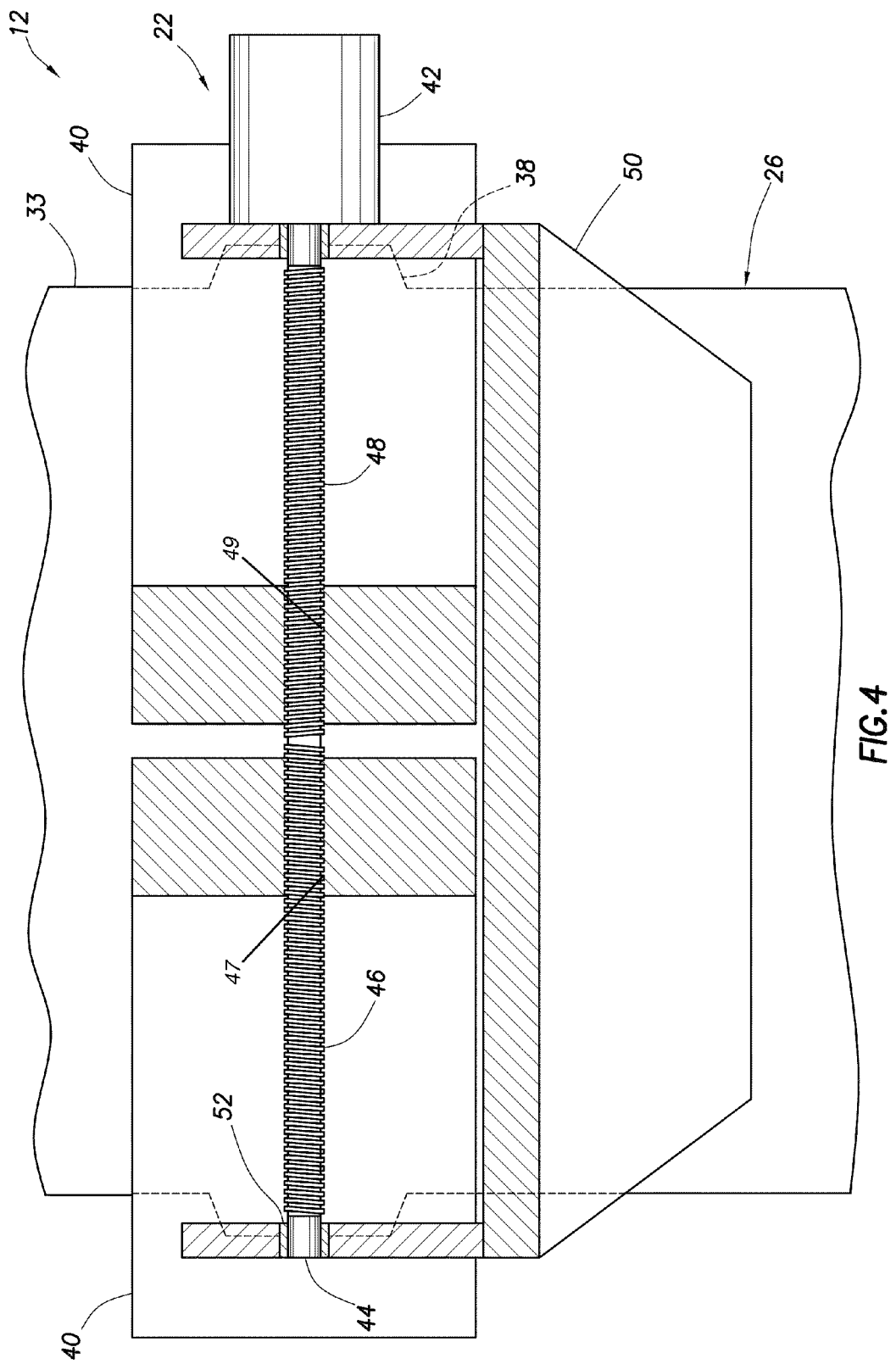
FIG. 4 is a schematic partially cross-sectional side view of the clamp device in a clamped arrangement.

Referring additionally now to FIG. 4, an enlarged scale side, partially cross-sectional view of the clamp device 22 on the RCD 12 is representatively illustrated. In the FIG. 4 illustration, the clamp device 22 is in a clamped configuration.

In this view it may be seen that the bearing housing assembly 33 and an upper seal housing 54 (see FIG. 2) of the RCD 12 is securely clamped to the body 26, due to displacement of the clamp sections 40 toward each other. This displacement is caused by rotation of the threaded member 44 by the motor 42, and the threaded engagement of the oppositely threaded portions 46, 48 with the respective threaded portions 47, 49 of the ends of the clamp sections 40.

Referring additionally now to FIG. 5, a top, partially cross-sectional view of the clamp device 22 in the closed configuration is representatively illustrated. Although only one lateral side of the clamp device 22 is shown in FIG. 5, it will be appreciated that the other side is preferably identical to the illustrated side.

Note that the motors 42 are preferably fluid motors, that is, motors which are operated in response to fluid pressure applied thereto. For example, the motors 42 could be hydraulic or pneumatic motors. However, other types of motors (such as electric motors) could be used, if desired.

Referring additionally now to FIG. 6, a schematic fluid circuit diagram for operation of the clamp device 22 is representatively illustrated. In this diagram, it may be seen that the motors 42 are connected via the lines 20 to a pressure source 56 (such as a pump, an accumulator, a pressurized gas container, etc.).

Pressure is delivered to the motors 42 from the pressure source 56 under control of a control system 58. For example, when it is desired to unclamp the clamp device 22, the control system 58 may cause the pressure source 56 to deliver a pressurized fluid flow to one of the lines 20 (with fluid being returned via the other of the lines), in order to cause the motors 42 to rotate the threaded members 44 in one direction. When it is desired to clamp the clamp device 22, the control system 58 may cause the pressure source 56 to deliver a pressurized fluid flow to another of the lines 20 (with fluid being returned via the first line), in order to cause the motors 42 to rotate the threaded members 44 in an opposite direction.

Connectors 60 may be provided for connecting the lines 20 to the pressure source 56, which is preferably positioned at a remote location on the rig 16. The motors 42 and/or threaded members 44 are preferably designed so that the threaded members will not rotate if the connectors 60 are disconnected, or if pressurized fluid is not flowed through the lines.

For example, a pitch of the threads on the threaded members 44 could be sufficiently fine, so that any force applied from the clamp sections 40 to the threaded members will not cause the threaded members to rotate. In this manner, the loss of a capability to apply fluid pressure to the motors 42 will not result in any danger that the clamp device 22 will become unclamped, even if the body 26 is internally pressurized.

Note that the motors 42 are preferably connected to the lines 20 in series, so that they operate simultaneously. In this manner, the ends of the clamp sections 40 will be displaced the same distance, at the same time, in equal but opposite directions, by the motors 42.

Although two lines 20 are depicted in FIG. 6 for flowing fluid to and from the pressure source 56 and motors 42, any number of lines (including one) may be used in keeping with the principles of this disclosure. If pressurized gas is used as the fluid, it may not be necessary to flow the gas from the motors 42 back to the pressure source 56 (for example, the gas could be exhausted to atmosphere).

Figure 7:
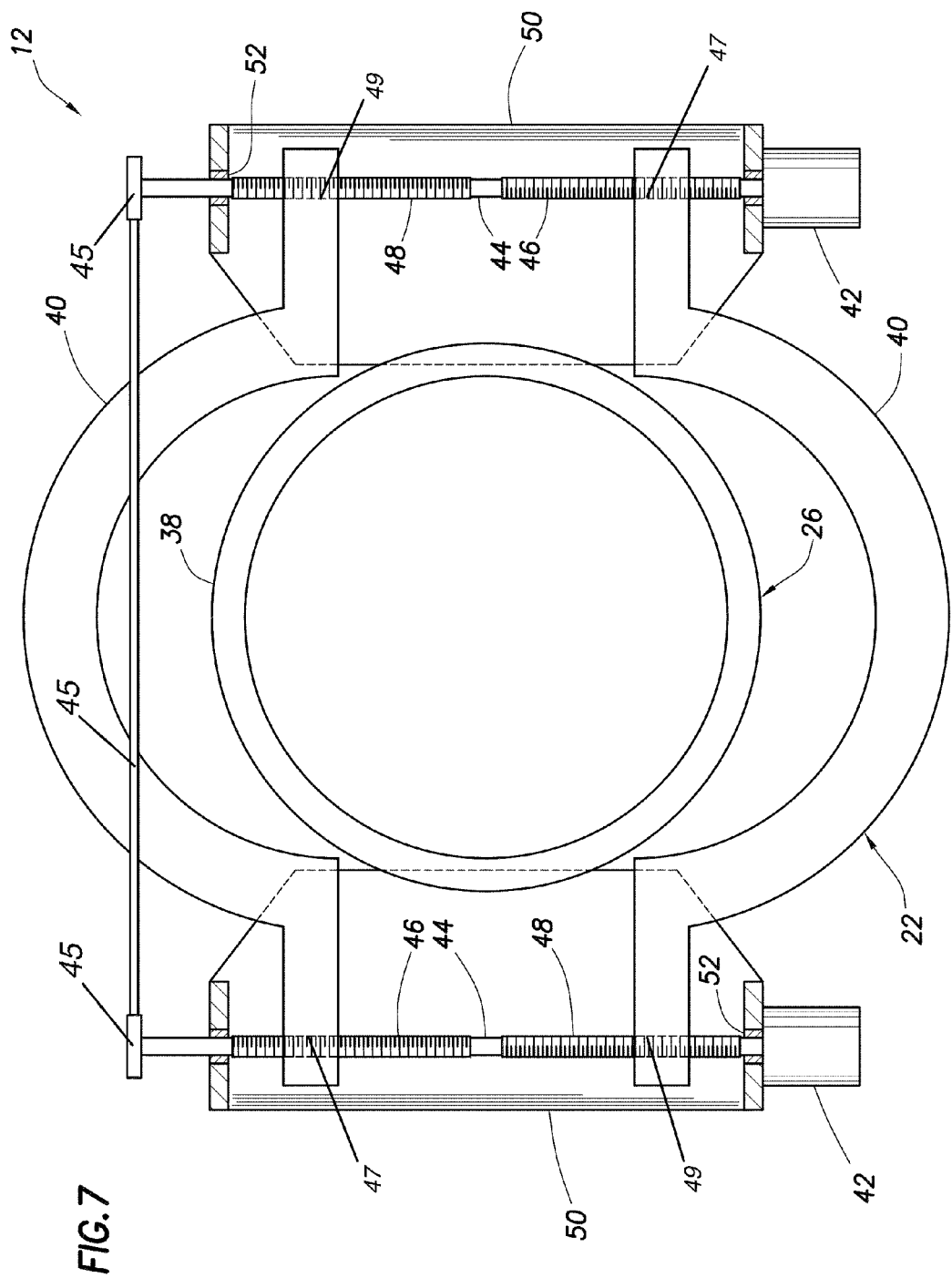
FIG. 7 is a schematic partially cross-sectional view of another configuration of the clamp device.

Referring additionally now to FIG. 7, another configuration of the clamp device 22 is representatively illustrated. The configuration of FIG. 7 is similar in many respects to the configuration of FIG. 3.

However, the threaded members 44 in the configuration of FIG. 7 are constrained to rotate together at the same speed by devices 45, such as sprockets and a chain, pulleys and a belt, gears, etc. This ensures that the clamp sections 40 are displaced the same distance at the same time on both sides of the body 26.

Two of the motors 42 are depicted in FIG. 7 for rotating the threaded members 44. However, only one motor 42 may be used, if desired.

Figure 8A:
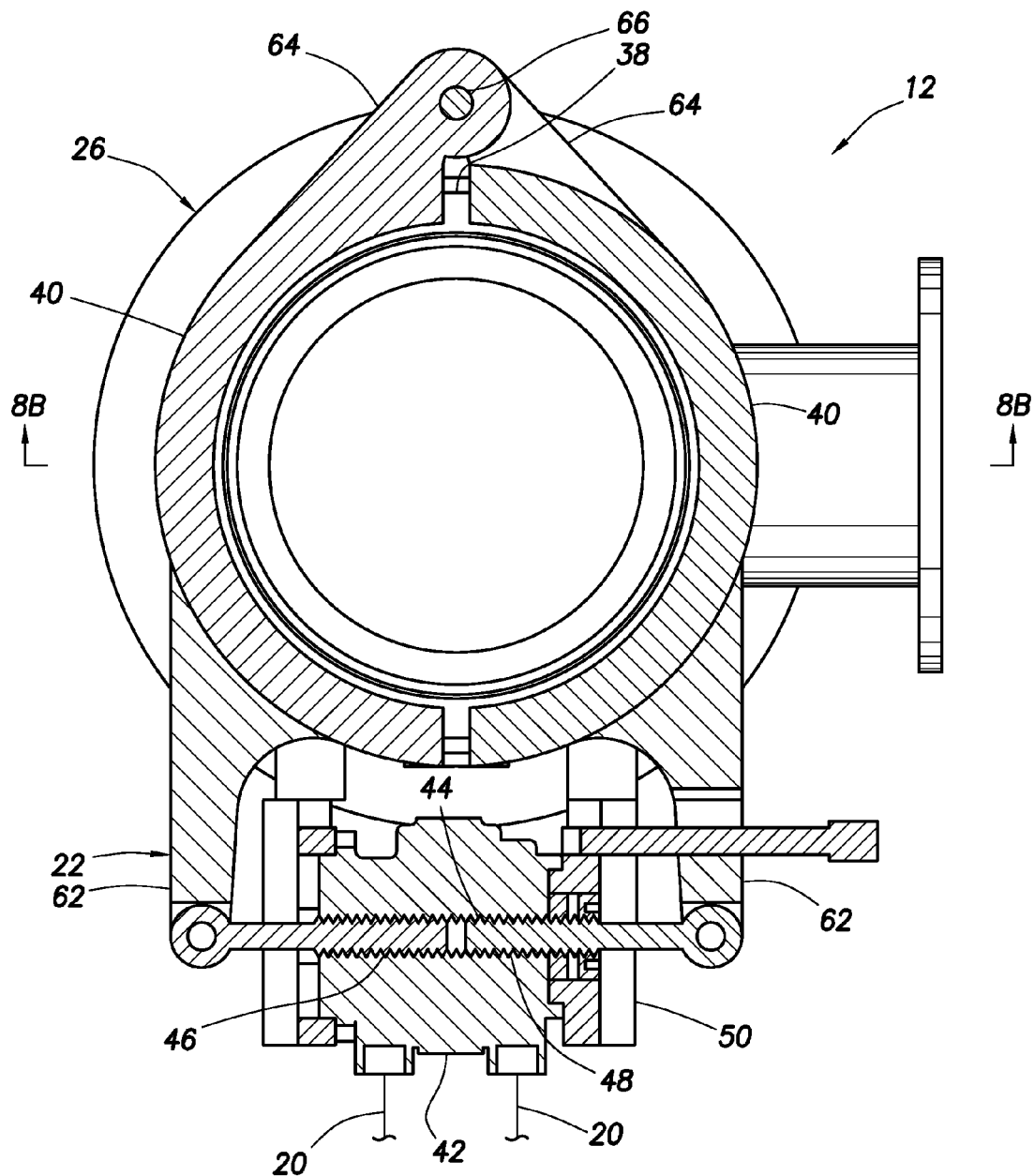
FIGS. 8A & B are schematic partially cross-sectional views of another configuration of the clamp device.
Figure 8B:
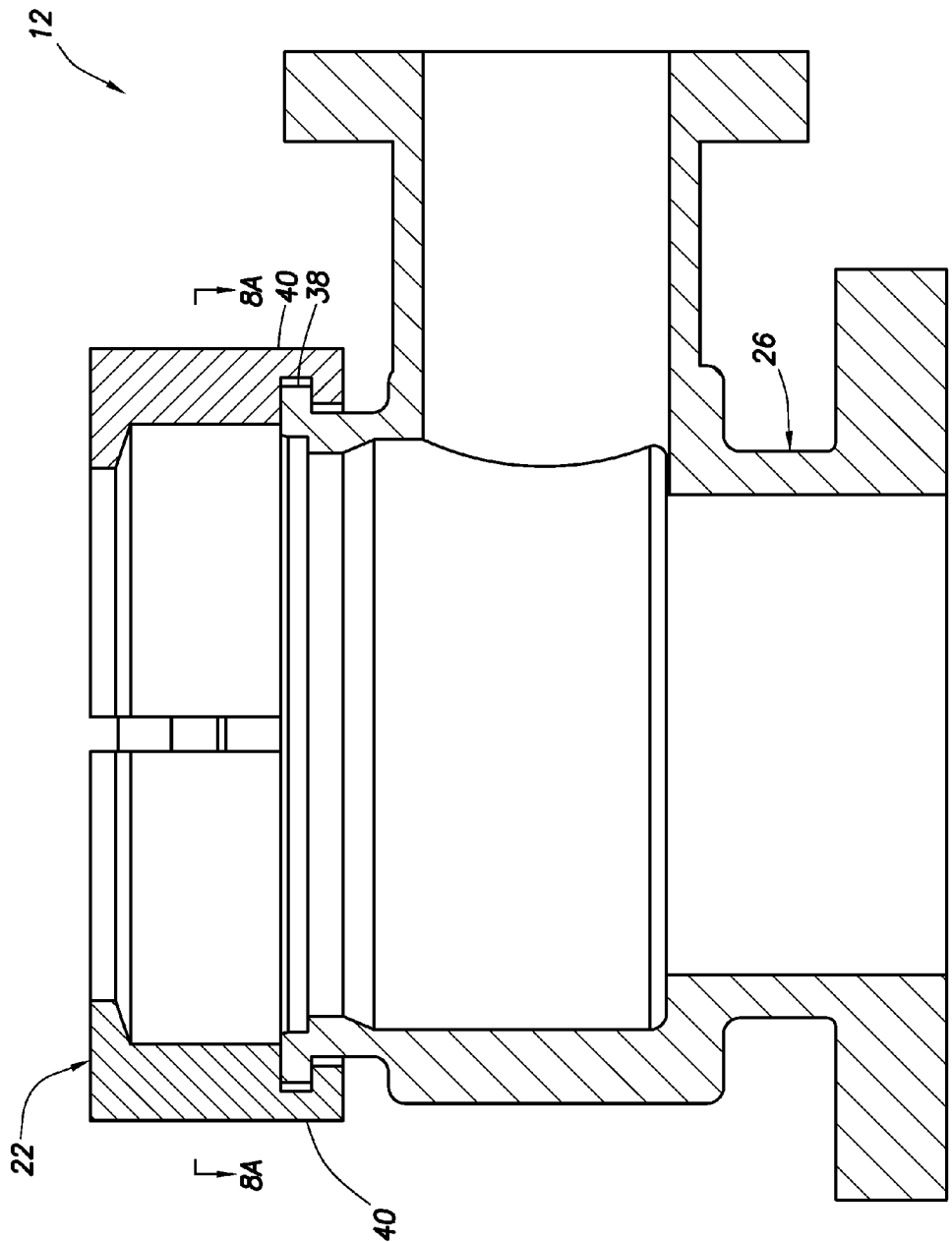

Referring additionally now to FIGS. 8A & B, another configuration of the clamp device 22 is representatively illustrated. In this configuration, the clamp device 22 includes a single fluid motor 42 positioned between ends 62 of the clamp sections 40. Opposite ends 64 of the clamp sections 40 are pivotably mounted to the body 26 at a pivot 66.

Unlike the previously described example, the motor 42 in the example of FIGS. 8A & B rotates an internally threaded member 44. Externally threaded portions 46, 48 are pivotably mounted to the ends 62 of the clamp sections 40. When the motor 42 rotates the threaded member 44, the threaded portions 46, 48 (and, thus, the ends 62 of the clamp sections 40) displace either toward each other, or away from each other, depending on the direction of rotation of the threaded member 44.

The clamp device 22 is depicted in its clamped arrangement in FIGS. 8A & B. It will be appreciated that, if the threaded member 44 is rotated by the motor 42 to displace the ends 62 of the clamp sections 40 away from each other, the clamp sections will pivot away from each other (on the pivot 66), thereby allowing removal or installation of the bearing housing assembly 33 onto the body 26.

The motor 42 is preferably slidably mounted to the body 26 so that, when the clamp sections 40 are displaced away from each other, the motor can move laterally inward toward the body. When the clamp sections 40 are displaced toward each other, the motor 42 can move laterally outward away from the body 26.

Figure 9A:
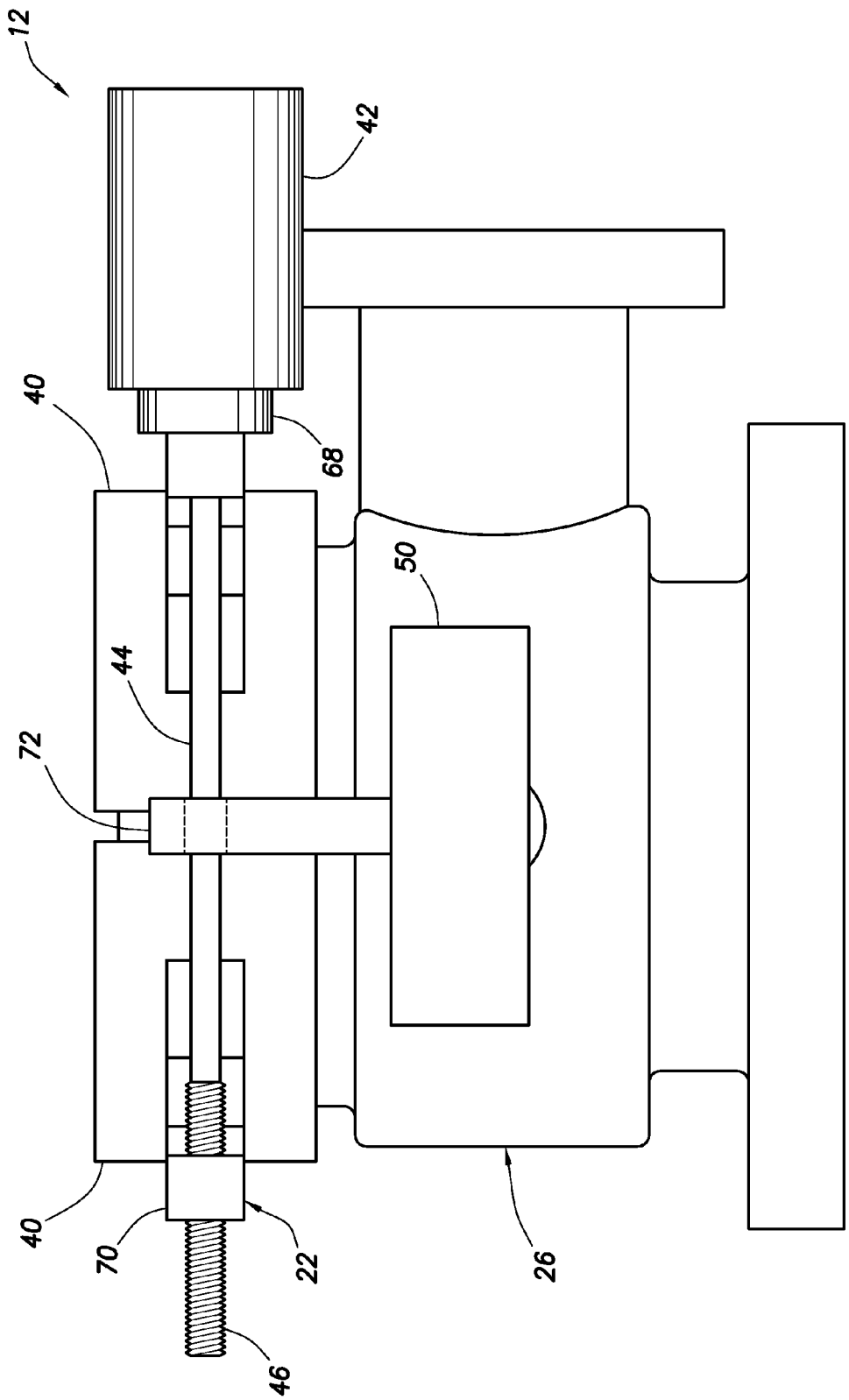
FIGS. 9A & B are schematic partially cross-sectional views of another configuration of the clamp device.
Figure 9B:
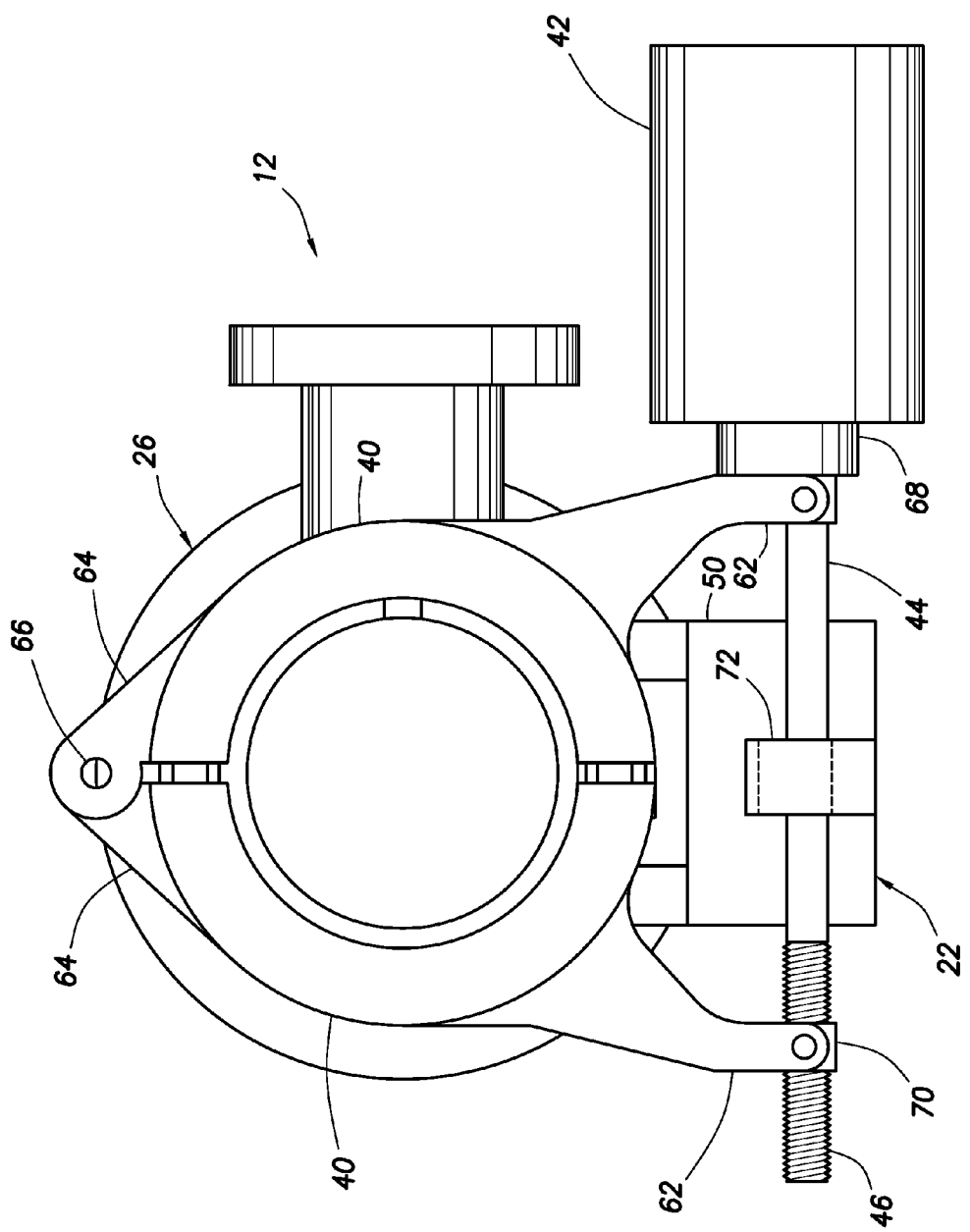

Referring additionally now to FIGS. 9A & B, another configuration of the clamp device 22 is representatively illustrated. In this configuration, the motor 42 is preferably a pneumatic motor, and is provided with a gearbox 68 for increasing a torque output of the motor.

The motor 42 is pivotably mounted to one of the clamp section ends 62. The threaded portion 46 of the threaded member 44 is received in an internally threaded member 70 pivotably mounted to the other clamp section end 62. A central stabilizer 72 is mounted to the support 50 for supporting the threaded member 44.

When the motor 42 rotates the threaded member 44, the ends 62 of the clamp sections 40 displace either toward or away from each other, with the clamp sections pivoting about the pivot 66. As with the other configurations described above, the motor 42 and/or threaded member 44 are preferably designed (e.g., with sufficiently fine pitch threads, by providing a brake for the motor, etc.) so that the loss of a capability to apply fluid pressure to the motor will not result in any danger that the clamp device 22 will become unclamped, even if the body 26 is internally pressurized.

Figure 10:
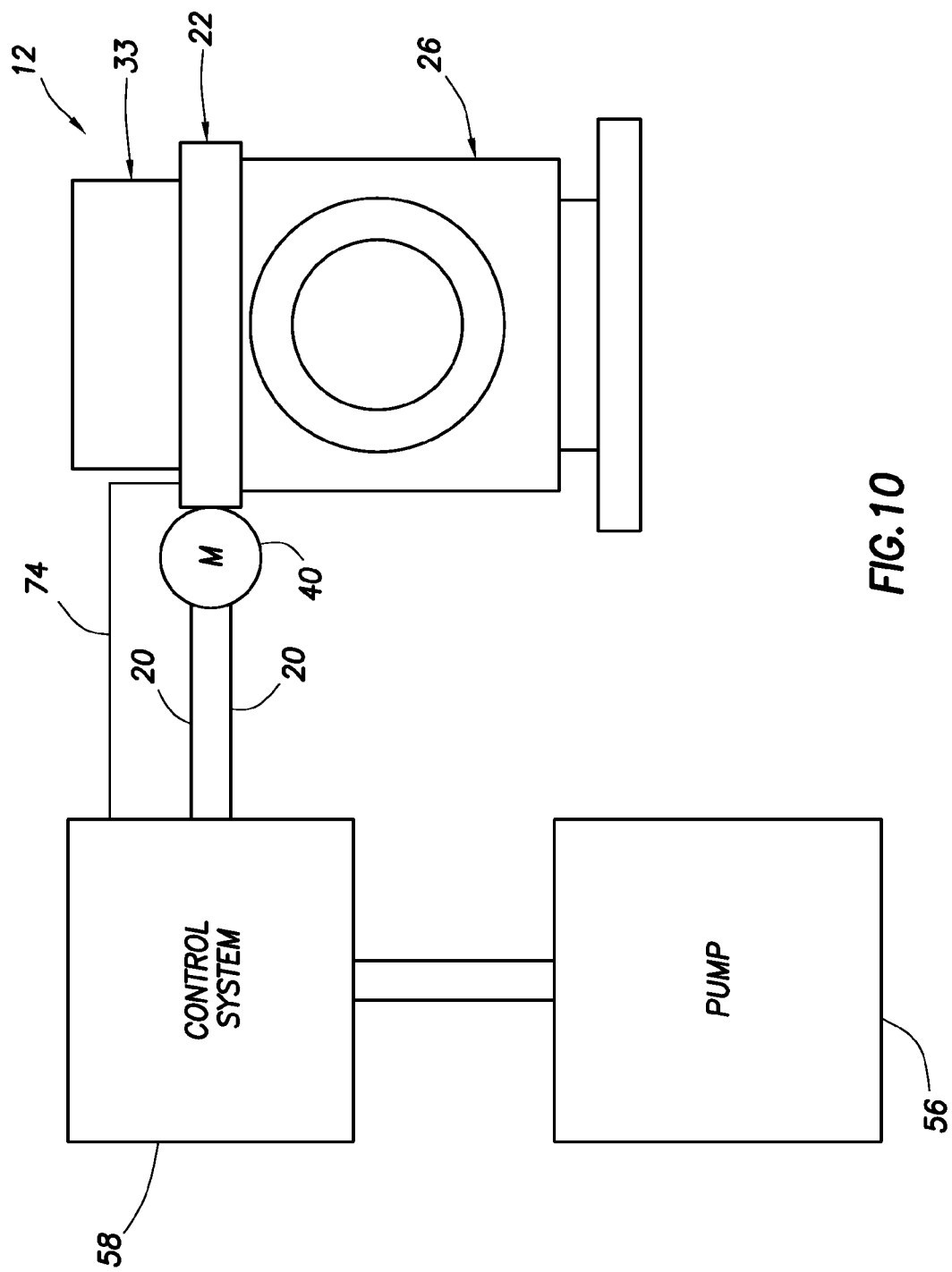
FIG. 10 is another schematic fluid circuit diagram for operation of the clamp device.

Referring additionally now to FIG. 10, another fluid circuit diagram for the RCD 12 is representatively illustrated. This fluid circuit diagram differs from the one depicted in FIG. 6, at least in that the control system 58 is interposed between the pressure source 56 and the motor 42. The control system 58 includes valves, etc. to direct pressure from the pressure source 56 to appropriate ones of the lines 20 to operate the motor 42.

In addition, one or more lines 74 may be used to transmit lubrication to the bearing assembly 32. One or more ports 76 (see FIG. 2) can be used for connecting the lines 74 to the interior of the housing assembly 33.

One advantage of the FIG. 10 fluid circuit is that the same pressure source 56 may be used to operate the clamp device 22, and to deliver lubricant to the bearing assembly 32. The control system 58 can direct lubricant to the bearing assembly 32 while the tubular string 28 is rotating within the RCD 12, and the control system can direct fluid pressure to the motor(s) 42 when needed to operate the clamp device 22.

Although the RCD 12 in its various configurations is described above as being used in conjunction with the floating rig 16, it should be clearly understood that the RCD can be used with any types of rigs (e.g., on a drill ship, semi-submersible, jack-up, tension leg, land-based, etc., rigs) in keeping with the principles of this disclosure.

Although separate examples of the clamp device 22 are described in detail above, it should be understood that any of the features of any of the described configurations may be used with any of the other configurations. For example, the pneumatic motor 42 of FIGS. 9A & B can be used with the clamp device 22 of FIGS. 3-8B, the pivoting clamp sections 40 of FIGS. 8A-9B can be used with the clamp device of FIGS. 3-7, etc.

It may now be fully appreciated that the above disclosure provides advancements to the art of operating a clamp device on a rotating control device. The clamp device 22 can be remotely operated, to thereby permit removal and/or installation of the bearing assembly 32 and seals 30, without requiring human activity in close proximity to the RCD 12.

The above disclosure provides to the art a rotating control device 12 which can include a housing assembly 33 containing a bearing assembly 32 and at least one annular seal 30 which rotates and seals off an annulus 24 between a tubular string 28 and a body 26 of the rotating control device 12, and a remotely operable clamp device 22 which selectively permits and prevents displacement of the housing assembly 33 relative to the body 26.

Pressure may be selectively supplied to the clamp device 22 from a pressure source 56, with the pressure source 56 being remotely located relative to the clamp device 22. Lubricant may also be supplied from the pressure source 56 to the bearing assembly 32.

The clamp device 22 can include at least one motor 42 which rotates at least one threaded member 44. The motor 42 may comprise a fluid motor. The threaded member 44 may comprise multiple threaded members. The motor 42 may comprise multiple motors.

The clamp device 22 may selectively permit and prevent separation of the bearing assembly 32 and annular seal 30 from the body 26.

Also provided by the above disclosure is a method of remotely operating a clamp device 22 on a rotating control device 12. The method can include rotating at least one threaded member 44 which is rotationally secured relative to a body 26 of the rotating control device 12; and displacing at least one clamp section 40 of the clamp device 22 in response to rotation of the threaded member 44, thereby selectively securing and releasing a bearing assembly 32 and at least one annular seal 30 relative to the body 26.

The method can also include supplying fluid pressure to at least one fluid motor 42, thereby causing the fluid motor to rotate the threaded member 44 The fluid pressure can be supplied from a location which is remote from the rotating control device 12.

The fluid motor 42 may comprise a hydraulic or pneumatic motor. Multiple fluid motors 42 can be used for rotating multiple respective threaded members 44. The method can include connecting the multiple fluid motors 42 in series, whereby the fluid motors 42 operate simultaneously.

The above disclosure also describes a rotating control device 12 which can comprise at least one annular seal 30 which rotates and seals off an annulus 24 between a tubular string 28 and a body 26 of the rotating control device 12, and a remotely operable clamp device 22 which selectively permits and prevents access to an interior of the body 26. The clamp device 22 can include at least one motor 42 which rotates a threaded member 44.

A pressure source 56 may supply fluid pressure to the motor 42, and the pressure source 56 may be remotely located from the motor 42.

The clamp device 22 may selectively prevent and permit separation of a bearing assembly 32 from the body 26. The annular seal 30 may rotate relative to the body 26 via the bearing assembly 32. The clamp device 22 may selectively prevent and permit separation of the annular seal 30 from the rotating control device 12.

It is to be understood that the various embodiments of the present disclosure described herein may be utilized in various orientations, such as inclined, inverted, horizontal, vertical, etc., and in various configurations, without departing from the principles of the present disclosure. The embodiments are described merely as examples of useful applications of the principles of the disclosure, which is not limited to any specific details of these embodiments.

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure. Accordingly, the foregoing detailed description is to be clearly understood as being given by way of illustration and example only, the spirit and scope of the present invention being limited solely by the appended claims and their equivalents.

What is claimed is:

1. A rotating control device, comprising:
 a housing assembly which contains a bearing assembly and at least one annular seal which rotates and seals off an annulus between a tubular string and a body of the rotating control device; and
 a remotely operable clamp device which selectively permits and prevents displacement of the housing assembly relative to the body, the clamp device comprising:
 first and second clamp sections which prevent displacement of the housing assembly relative to the body when the clamp device is clamped and which permit displacement of the housing assembly relative to the body when the clamp device is unclamped;

first and second threaded members, the first threaded member threadedly engaging corresponding threads in the first and second clamp sections on a first side of the clamp device, and the second threaded member threadedly engaging corresponding threads in the first and second clamp sections on a second side of the clamp device opposite the first side; and at least one motor, wherein simultaneous rotation of the first and second threaded members by the at least one motor causes linear displacement of the clamp sections in opposite directions, thereby selectively permitting and preventing displacement of the housing assembly relative to the body, wherein the curved clamp sections substantially jointly form a circle when the clamp device is clamped.

2. The rotating control device of claim 1, wherein pressure is selectively supplied to the clamp device from a pressure source, and wherein the pressure source is remotely located relative to the clamp device.

3. The rotating control device of claim 2, wherein lubricant is also supplied from the pressure source to the bearing assembly.

4. The rotating control device of claim 1, wherein first and second motors rotate the first and second threaded members, respectively.

5. The rotating control device of claim 4, wherein the first and second motors are fluid motors.

6. The rotating control device of claim 5, wherein the first and second motors are connected in series.

7. The rotating control device of claim 1, wherein the at least one motor is selected from a group consisting of a hydraulic motor, a pneumatic motor and an electric motor.

8. The rotating control device of claim 1, wherein the clamp device selectively permits and prevents separation of the bearing assembly and annular seal from the body.

9. A method of remotely operating a clamp device on a rotating control device, the method comprising:

rotating at least two threaded members which are rotationally secured relative to a body of the rotating control device, the threaded members being constrained to rotate together; and linearly displacing at least two clamp sections of the clamp device in response to rotation of the threaded members, thereby selectively securing and releasing a bearing assembly and at least one annular seal relative to the body, wherein the curved clamp sections substantially jointly form a circle when the clamp device is clamped.

10. The method of claim 9, further comprising supplying fluid pressure to at least one fluid motor, thereby causing the fluid motor to rotate the threaded members.

11. The method of claim 10, wherein supplying fluid pressure further comprises supplying the fluid pressure from a location which is remote from the rotating control device.

12. The method of claim 10, wherein the fluid motor comprises a hydraulic motor.

13. The method of claim 10, wherein the fluid motor comprises a pneumatic motor.

14. The method of claim 10, wherein supplying fluid pressure further comprises multiple fluid motors rotating respective threaded members.

15. The method of claim 14, further comprising connecting the fluid motors in series, whereby the fluid motors operate simultaneously.

16. A rotating control device, comprising:

at least one annular seal which rotates and seals off an annulus between a tubular string and a body of the rotating control device; and a remotely operable clamp device which selectively permits and prevents separation of the annular seal from the body, the clamp device comprising:

first and second clamp sections, which substantially jointly form a circle when the clamp device is clamped;

at least first and second threaded members, the first threaded member threadedly engaging corresponding threads in the first clamp section, and the second threaded member threadedly engaging corresponding threads in the second clamp section; and at least one motor which rotates the at least first and second threaded members, wherein the clamp sections are linearly displaced when the threaded members rotate, and wherein the motor is positioned between ends of the clamp sections.

17. The rotating control device of claim 16, wherein a pressure source supplies fluid pressure to the motor, and wherein the pressure source is remotely located from the motor.

18. The rotating control device of claim 16, wherein the clamp device selectively prevents and permits separation of a bearing assembly from the body.

19. The rotating control device of claim 18, wherein the annular seal rotates relative to the body via the bearing assembly.

20. The rotating control device of claim 16, wherein the motor is selected from a group consisting of a hydraulic motor, a pneumatic motor and an electric motor.

21. The rotating control device of claim 16, wherein the clamp sections cooperate to secure the annular seal to the body of the rotating control device in response to rotation of the threaded members in a first direction, and wherein the clamp sections cooperate to release the annular seal from the body of the rotating control device in response to rotation of the threaded members in a second direction opposite to the first direction.

22. The rotating control device of claim 21, wherein each of the clamp sections is displaced in respective opposite linear directions in response to rotation of the threaded members.

* * * * *